US 8,979,273 B2

(12) United States Patent
Ueda

(10) Patent No.: US 8,979,273 B2
(45) Date of Patent: Mar. 17, 2015

(54) LINE DISPLAY SYSTEM USING PROJECTOR

(75) Inventor: Yuki Ueda, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 282 days.

(21) Appl. No.: 13/297,596

(22) Filed: Nov. 16, 2011

(65) Prior Publication Data

US 2013/0120715 A1  May 16, 2013

(51) Int. Cl.
*G03B 21/26* (2006.01)
*A63G 31/00* (2006.01)
*H04N 9/31* (2006.01)
*A63C 19/06* (2006.01)
*G03B 21/20* (2006.01)

(52) U.S. Cl.
CPC .......... *H04N 9/3147* (2013.01); *G03B 21/2086* (2013.01); *A63C 19/065* (2013.01); *A63C 2019/067* (2013.01); *H04N 9/3185* (2013.01)
USPC .................................. 353/28; 353/94; 472/61

(58) Field of Classification Search
CPC ... G03B 21/26; G09B 19/0038; H04N 9/3147
USPC .............. 353/5, 11, 28, 12, 114, 30, 122, 94; 434/44, 69, 247, 248, 251; 352/48; 472/61, 75, 76; 463/34, 30; 473/422
See application file for complete search history.

(56) References Cited

U.S. PATENT DOCUMENTS

| | | | | |
|---|---|---|---|---|
| 6,840,625 B2 * | 1/2005 | Koyama et al. | | 353/31 |
| 2002/0105623 A1 * | 8/2002 | Pinhanez | | 353/69 |
| 2005/0128437 A1 * | 6/2005 | Pingali et al. | | 353/69 |
| 2007/0273842 A1 * | 11/2007 | Morrison et al. | | 353/97 |
| 2008/0297740 A1 * | 12/2008 | Huynh et al. | | 353/94 |
| 2009/0185139 A1 * | 7/2009 | Morikuni | | 353/30 |
| 2011/0242507 A1 * | 10/2011 | Smith | | 353/121 |

FOREIGN PATENT DOCUMENTS

| | | |
|---|---|---|
| JP | 2005-159385 A | 6/2005 |
| JP | 2008-188135 A | 8/2008 |

* cited by examiner

*Primary Examiner* — William C Dowling
*Assistant Examiner* — Ryan Howard
(74) *Attorney, Agent, or Firm* — ALG Intellectual Property, LLC

(57) ABSTRACT

[Problem] A line display system capable of changing a line easily when the sporting event is changed is to be provided.

[Means for Resolution] A line display system 1 includes plural projectors 100A, 100B each of which is installed to project a line image on a floor surface F or ground surface.

17 Claims, 12 Drawing Sheets

| INSTALLATION ANGLE θ1 (UNIT: DEGREES) | KEYSTONE CORRECTION ANGLE θ2 (UNIT: DEGREES) | MAGNIFICATION IN DIRECTION OF HEIGHT OF PROJECTED IMAGE k |
|---|---|---|
| 0 | 0 | 1.000 |
| 10 | 2.69 | 1.354 |
| 20 | 5.28 | 2.681 |
| 30 | 7.70 | 5.646 |
| 40 | 9.85 | 11.415 |
| 50 | 11.68 | 22.491 |
| 60 | 13.16 | 46.521 |
| 70 | 14.23 | 186.643 |

LINE DISPLAY SYSTEM USING PROJECTOR

TECHNICAL FIELD

The present invention relates to a line display system using a projector.

BACKGROUND ART

In a gymnasium, stadium or the like, since various sports are played, lines are installed according to the sporting event. In the related art, lime or paint is used, or cloths, strings and the like are used for the installation of lines. When different sports are played, the lines are erased or removed and lines are reinstalled anew. However, there is a problem that such erasure or removal of the lines and reinstallation of lines take time and effort. Moreover, in some cases, lines for plural sporting events are installed in advance in a coexisting manner in a gymnasium or stadium but athletes become confused.

Patent Document 1 discloses a system for assisting the work of installing different field lines for each sport in a multipurpose stadium, utilizing a wireless IC tag buried in advance in the stadium and a portable computer capable of reading the wireless IC tag.

RELATED ART DOCUMENT

Patent Document

[Patent Document] JP-A-2008-188135

SUMMARY OF THE INVENTION

Problems that the Invention is to Solve

However, the line installation assisting system of Patent Document 1 has a problem that the time and effort to reinstall lines cannot be reduced. Also, there is a problem that the system can only cope with predetermined sports since the wireless IC tag must be buried. Therefore, a line installation system (line display system) which can change lines easily when the sporting event is changed is desired.

Means for Solve the Problems

The invention is made in order to solve the above problems at least in part and can be realized in the following forms or application examples.

Application Example 1

A line display system according to this application example is a line display system which displays a line image representing a court or field corresponding to a sporting event, on a floor surface or ground surface. The system includes plural projectors each of which is installed to project the line image on the floor surface or ground surface.

According to such a line display system, each of the plural projectors is installed to project the line image on the floor surface or ground surface. Thus, since lines are displayed (projected) by the projectors, cases of changing the sporting event can be easily coped with by changing the line image projected by the projectors. Also, since the lines are displayed by the plural projectors, sporting events which require a large area can be easily coped with.

Application Example 2

In the line display system according to the above application example, the plural projectors are installed at different positions from each other and project the line image from plural directions so that the line images are superimposed on each other on the floor surface or ground surface.

According to such a line display system, the plural projectors project the line image from plural different positions. Therefore, even when the line image projected from one direction is interrupted by an athlete, the lines are displayed by the line image projected from the other directions and therefore failure to display the lines can be reduced.

Application Example 3

In the line display system according to the above application example, each of the plural projectors is installed at a lower position than a predetermined height in relation to the floor surface or ground surface and projects the line image from obliquely above.

According to such a line display system, the line image can be projected obliquely from a lower position than the height of the athlete's eyes, that is, the predetermined height. Therefore, dazzlement of projected light can be reduced, compared with the case of projecting from a perpendicular direction to the floor surface or ground surface. Also, the light of the line image projected by the projectors can be prevented from becoming incident directly on the athlete's eyes.

Application Example 4

In the line display system according to the above application example, each of the plural projectors includes a line information storage unit which stores plural pieces of line information as information of the line image, and a selection operation accepting unit which accepts a selection operation to select one of the plural pieces of line information stored in the line information storage unit. The plural projectors project the line image based on the line information selected by the selection operation accepting unit.

According to such a line display system, the projectors include the line information storage unit and the selection operation accepting unit. The line information storage unit stores plural pieces of line information. The selection operation accepting unit accepts a selection operation to select one of the plural pieces of line information. Then, the projectors project the line image based on the selected line information. Thus, since the line information is stored in the projectors, there is no need to connect a device for supplying the line information to the projectors and the line display system can be simplified. Moreover, since the user can select line information via the selection operation accepting unit provided in the projectors, convenience is improved.

Application Example 5

The line display system according to the above application example further includes a line information supply device which stores plural pieces of line information as information of the line image and supplies the line information to the projectors. The plural projectors project the line image based on the line information supplied from the line information supply device.

According to such a line display system, the line information supply device is provided. The line information supply device stores plural pieces of line information and supplies the line information to the projectors. Then, the projectors project the line image based on the supplied line information. Thus, various kinds of line information can be stored in the line information supply device and line information can be added easily. Then, since the projectors can project the line image based on the line information supplied from the line information supply device, the configuration of the projectors can be simplified.

Application Example 6

In the line display system according to the above application example, each of the projectors has a communication unit for communicating with the other projector(s). The projector transmits and receives the line information to and from the other projector(s) via the communication unit. The plural projectors project the line image of the same sporting event.

According to such a line display system, the projectors have the communication unit for communicating with the other projector(s). The line information is transmitted and received between the projector and the other projector(s). The plural projectors project the line image of the same sporting event. Thus, each projector can determine and project the line image of the sporting event to be projected, based on the transmitted or received line information. That is, as the user performs a selection operation for line information on one projector, the line information is transmitted from the projector to the other projector(s). Therefore, the user no longer needs to perform a selection operation for line information on the other projector(s) and convenience is improved.

Application Example 7

In the line display system according to the above application example, each of the plural projectors includes an image pickup unit which picks up an image of an area including a projected line image area, a picked-up image analyzing unit which analyzes the image picked up by the image pickup unit, and an image mute unit which stops projection of the line image by the projector when a human face is detected by the picked-up image analyzing unit.

According to such a line display system, the projectors include the image pickup unit, the picked-up image analyzing unit which analyzes the picked-up image, and the image mute unit which stops projection of the line image when a human face is detected. That is, when a human face is detected in the image picked up by the image pickup unit, the projectors temporarily stop projection of the line image. Thus, if a human face enters the optical path of projected light while the projectors are projecting the line image, the projection of the line image is stopped. Therefore, it can be avoided that a person finds the projected light dazzling.

EMBODIMENT OF THE INVENTION

Hereinafter, embodiments will be described.

First Embodiment

In a first embodiment, a line display system having plural projectors in which line information is stored will be described.

Figure 1:
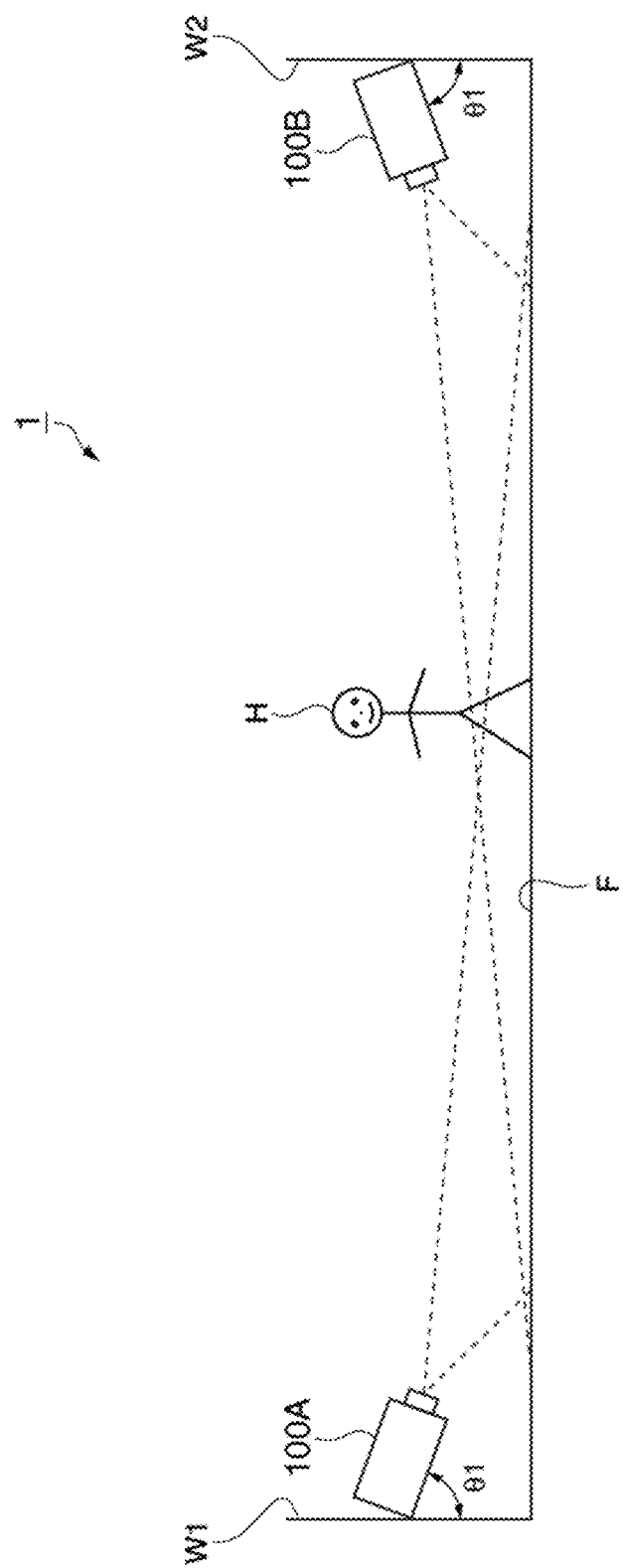
FIG. 1 is an explanatory view showing a state of a stadium where a line image is projected by a line display system according to a first embodiment, as viewed from a lateral side.

FIG. 1 is an explanatory view showing a state of a stadium where a line image is projected by the line display system according to the first embodiment, as viewed from a lateral side. As shown in FIG. 1, the line display system 1 of this embodiment includes two projectors 100A, 100B. Also, FIG. 1 shows an athlete H. In this embodiment, it is assumed that the stadium is a gymnasium and that the line image is projected on a floor surface F.

The projector 100A is installed at a lower position than the height of the eyes of the athlete H, on a wall W1 of the gymnasium, and projects a line image on the floor surface F from an oblique direction. The angle between the wall W1 and the projector 100A at this time is θ1. Also, the projector 100B is installed at a lower position than the height of the eyes of the athlete H, on a wall W2 opposite to the wall W1, and projects a line image on the floor surface F from an oblique direction. The angle between the wall W2 and the projector 100B at this time is θ1, too. As the projector 100A and the projector 100B thus project the line images respectively on the floor surface F, lines are displayed on the floor surface F. In this embodiment, the lower position than the height of the eyes of the athlete H is, for example, approximately 1 m.

Figure 2:
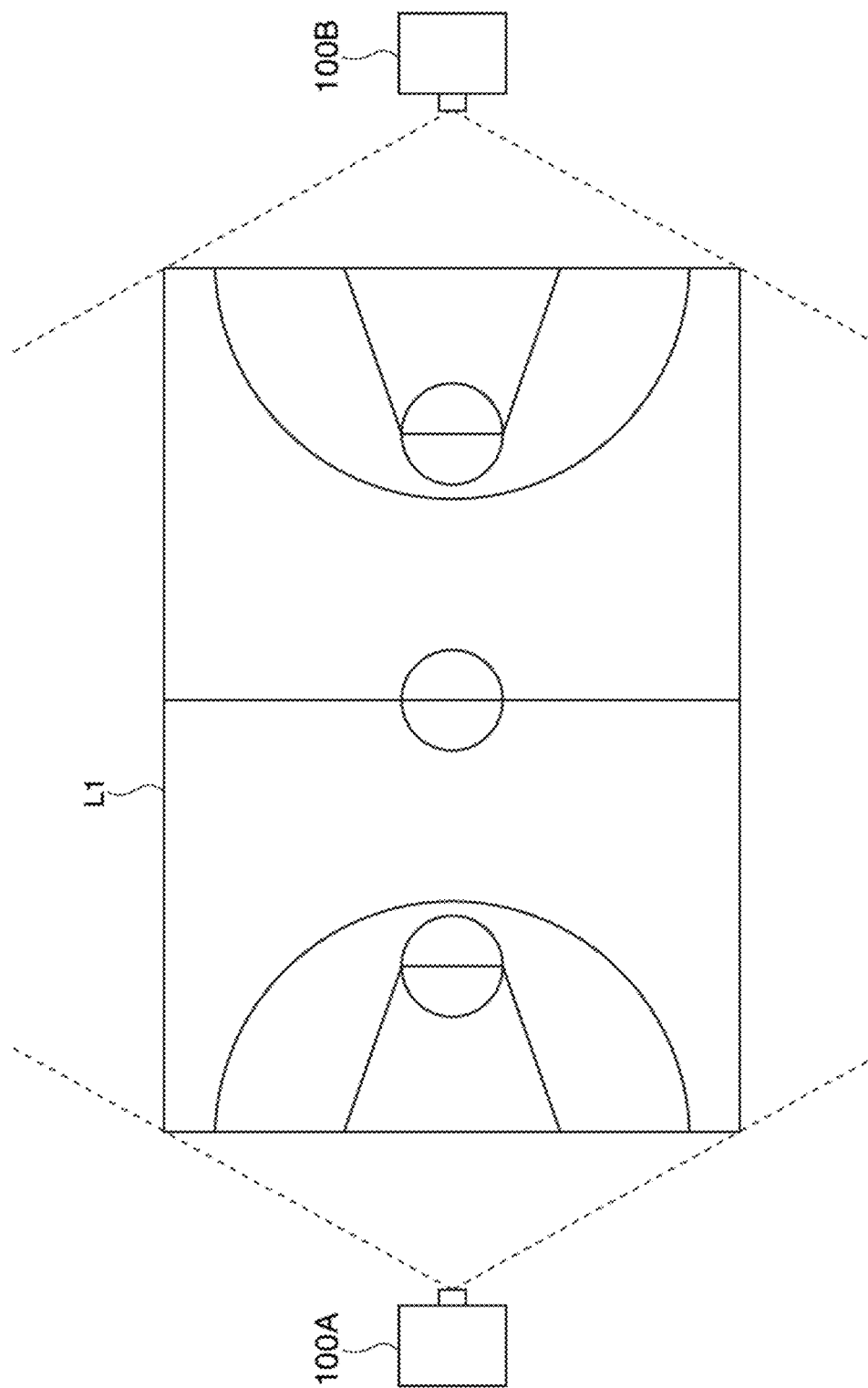
FIG. 2 It is an explanatory view showing a state of a stadium where a line image is projected by the line display system, as viewed from above.

FIG. 2 is an explanatory view showing a state of a stadium (gymnasium) where a line image is projected by the line display system 1 according to this embodiment, as viewed from above. In FIG. 2, a line image representing lines L1 of a basketball court is projected. The projector 100A projects the line image of the basketball court from a left direction in the drawing. The projector 100B projects the line image of the basketball court from a right direction in the drawing. The lines projected by the projector 100A and the lines projected by the projector 100B are superimposed on each other on the floor surface F and displayed as the lines L1.

Figure 3:
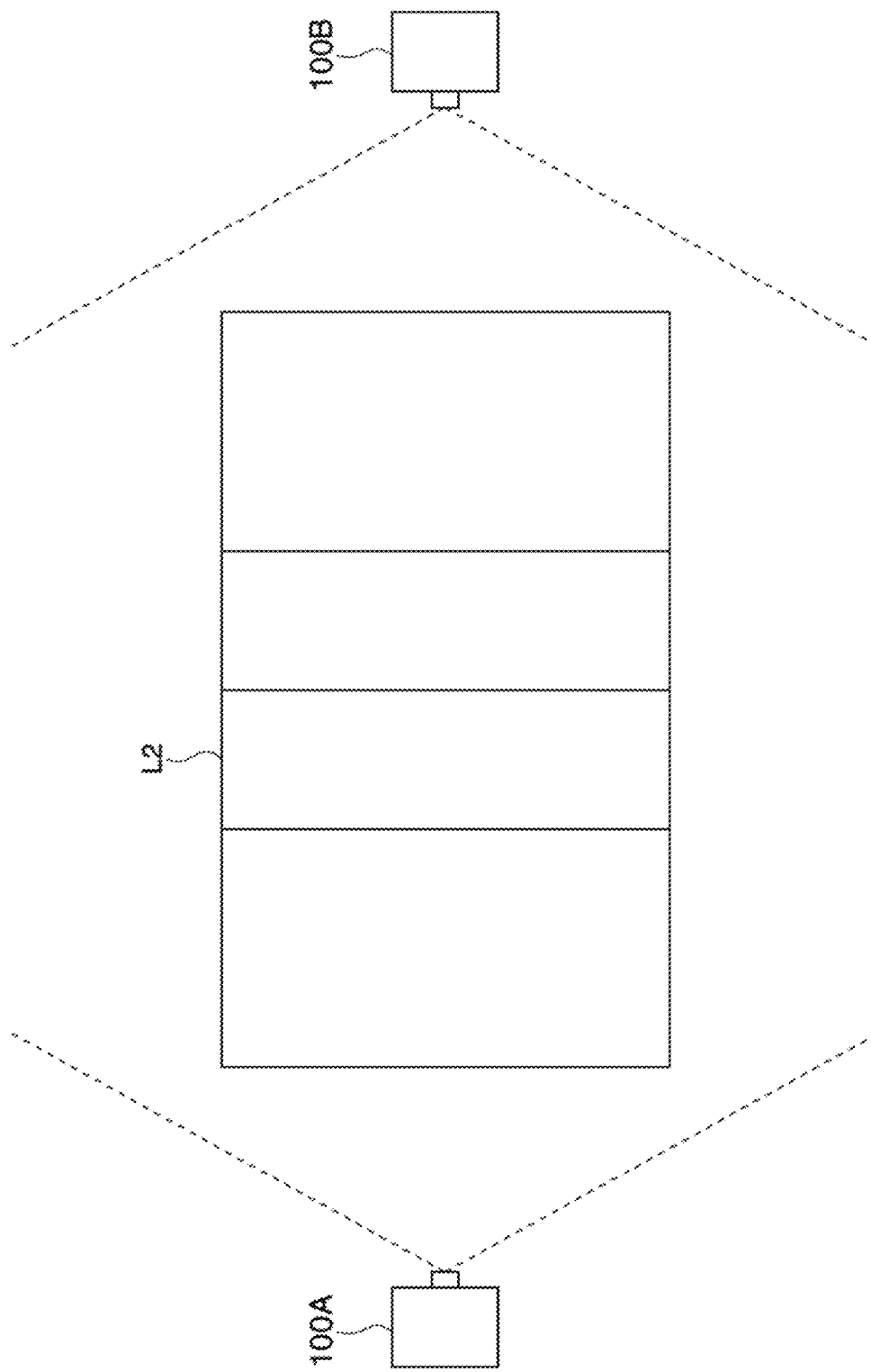
FIG. 3 It is an explanatory view showing a state of a stadium where a line image is projected by the line display system, as viewed from above.

FIG. 3 is an explanatory view showing a state of a stadium (gymnasium) where a line image is projected by the line display system 1 according to this embodiment, as viewed from above. In FIG. 3, a line image representing lines L2 of a volleyball court is displayed. The projector 100A projects the line image of the volleyball court from a left direction in the drawing. The projector 100B projects the line image of the volleyball court from a right direction in the drawing. The lines projected by the projector 100A and the lines projected by the projector 100B are superimposed on each other on the floor surface F and displayed as the lines L2.

As described above, the line display system 1 can display line of courts of various sporting events.

Next, the projector 100A (and the projector 100B) provided in the line display system 1 according to this embodiment will be described.

Figure 4:
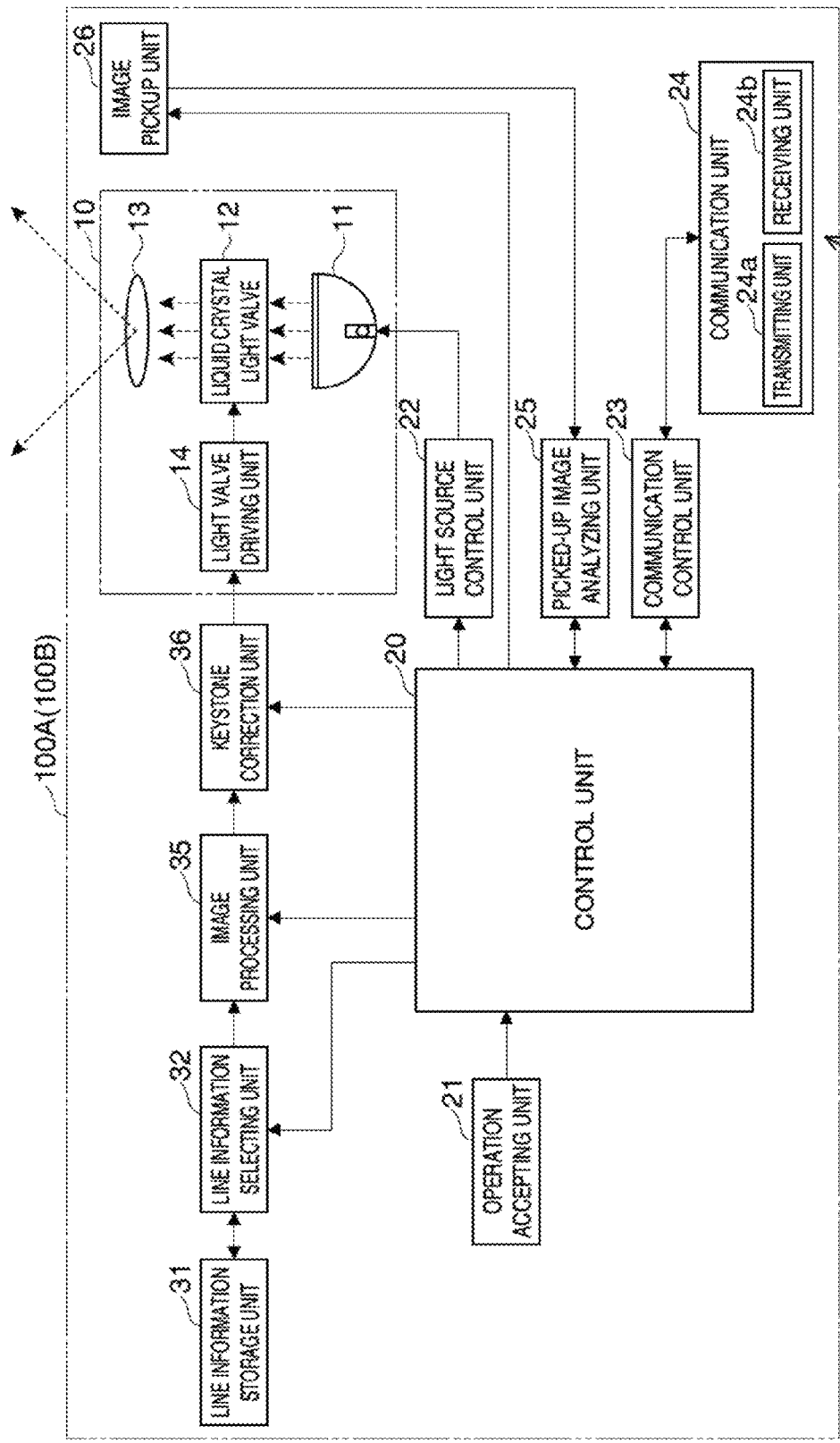
FIG. 4 It is a block diagram showing a schematic configuration of a projector.

FIG. 4 is a block diagram showing a schematic configuration of the projector 100A according to this embodiment. Using FIG. 4, the internal configuration of the projector 100A will be described. By the way, the internal configuration of the projector 100B is assumed to be similar to the projector 100A.

The projector 100A includes an image projecting unit 10, a control unit 20, an operation accepting unit 21, a light source control unit 22, a communication control unit 23, a communication unit 24, a picked-up image analyzing unit 25, an image pickup unit 26, a line information storage unit 31, a line information selecting unit 32, an image processing unit 35, a keystone correction unit 36, and the like.

The image projecting unit 10 includes a light source 11 made up of a discharge-type light source such as an ultra-high pressure mercury lamp or metal halide lamp, or a solid-state light source such as an LED (light emitting diode) or laser, a liquid crystal light valve 12 as a light modulator which modulates the light exiting the light source 11, a projection lens 13 which projects the modulated light exiting the liquid crystal light valve 12, and a light valve driving unit 14 which drives the liquid crystal light valve 12.

Figure 5:
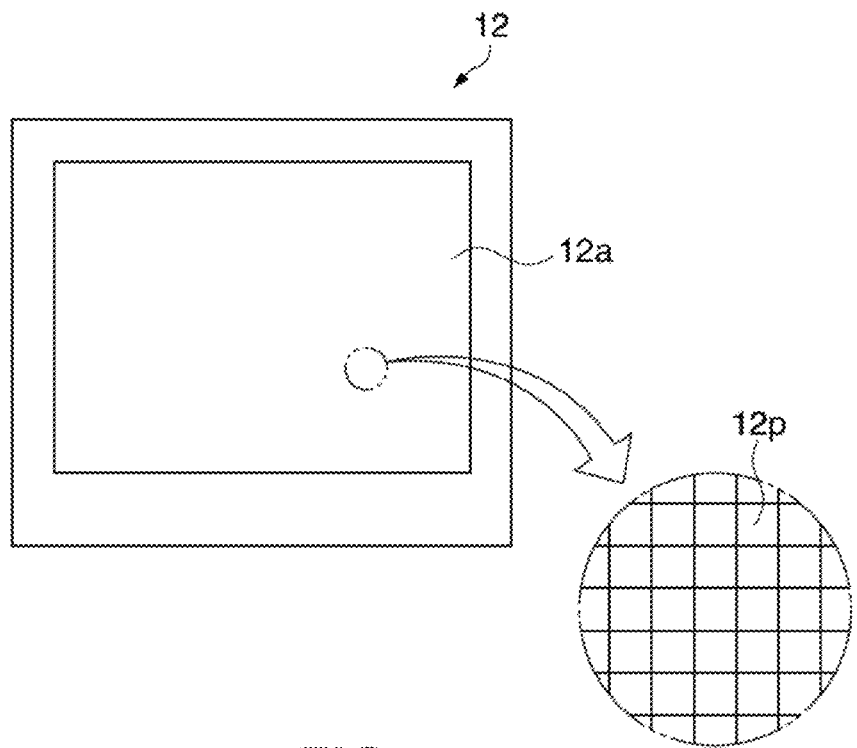
FIG. 5 It is a front view showing a liquid crystal light valve.

FIG. 5 is a front view showing the liquid crystal light valve. The liquid crystal light valve 12 is formed by a liquid crystal panel or the like including a pair of transparent substrates with a liquid crystal enclosed between the substrates. As shown in FIG. 5, on an inner surface of each transparent substrate, transparent electrodes (pixel electrodes) capable of applying a drive voltage to each micro area (pixel 12$p$) on the liquid crystal are formed in a matrix-like form within a rectangular area (pixel area 12$a$). As a drive voltage corresponding to an image signal is applied to each pixel 12$p$ of the liquid crystal light valve 12 by the driving of the light valve driving unit 14, each pixel 12$p$ transmits light source light at a light transmittance corresponding to image information.

The light exiting the light source 11 is modulated by being transmitted through this liquid crystal light valve 12. As the modulated light is projected by the projection lens 13, an image (line image) corresponding to image information (line information) is displayed on the floor surface F or the like.

Back to FIG. 4, the control unit 20 includes a CPU (central processing unit), a RAM (random access memory) used for temporary storage or the like of various data, and a non-volatile memory or the like such as a mask ROM (read only memory), flash memory, or FeRAM (ferroelectric RAM: ferroelectric memory) (none of them being shown), and functions as a computer. The control unit 20 generally controls the projector 100A as the CPU operates according to a control program stored in the non-volatile memory.

The operation accepting unit 21 has plural keys for accepting various input operations on the projector 100A. As the keys provided on the operation accepting unit 21, there are "power key" for turning on and off the power source, "line image switching key" for switching the line image to be projected, "menu key" for switching between display and non-display of a menu screen for various settings, "cursor key" used for cursor movement in the menu screen and keystone correction, "decision key" for deciding various settings, and the like. By the way, the operation accepting unit 21 having the line image switching key is equivalent to the selection operation accepting unit.

As the user operates the operation accepting unit 21, the operation accepting unit 21 outputs an operation signal corresponding to the user's operation content to the control unit 20. Also, the operation accepting unit 21 may have a configuration including a remote control signal receiving unit (not shown) and a remote controller capable of remote control (not shown). In this case, the remote controller issues an operation signal of infrared rays or the like corresponding to the user's operation content, and the remote control signal receiving unit receives and transmits this to the control unit 20.

The light source control unit 22 controls supply and stop of power to the light source 11, based on an instruction from the control unit 20, and switches turning on and off of the light source 11.

The communication control unit 23 gives an instruction to the communication unit 24, based on an instruction from the control unit 20, to transmit and receive line information to and from the other projector 100B (or 100A) provided in the line display system 1. As the line information is thus transmitted to and received from the other projector 100B (or 100A), the control units 20 of the projector 100A and 100B can select the line information of the same sporting event.

The communication unit 24 is configured with a transmitting unit 24$a$ and a receiving unit 24$b$, and communicates with a communication unit (not shown) provided in the other projector 100B (or 100A), based on an instruction from the communication control unit 23, to transmit and receive line information.

The transmitting unit 24$a$ is configured with an antenna which transmits wireless communication waves, a wireless unit which modulates a signal transmitted via the antenna, and a base band signal processing unit which carries out base band signal processing (none of them being shown). The transmitting unit 24$a$ transmits the line information selected by this projector 100A (or 100B) as a wireless signal, according to an instruction from the communication control unit 23.

The receiving unit 24$b$ is configured with an antenna which receives wireless communication waves, a wireless unit which demodulates a signal received via the antenna, and a base band signal processing unit which carries out base band signal processing (none of them being shown). The receiving unit 24$b$ receives the line information transmitted as a wireless signal from the other projector 100B (or 100A) and transmits the line information to the communication control unit 23.

The picked-up image analyzing unit 25 analyzes picked-up image data of a picked-up image that is picked up by the image pickup unit 26, based on an instruction from the control unit 20, and detects a human face. Human face detection can be carried out using a known face detection technique. As known face detection techniques, there are face detection based on pattern matching using average faces or the like, faces detection based on extraction of skin color area, face detection based on an SVM (support vector machine) determination method using frequency characteristics of a face organ, and the like. As a human face is detected, the picked-up image analyzing unit 25 notifies the control unit 20.

The image pickup unit 26 is configured with a CCD (charge coupled device) camera and is provided on the same lateral side as the projection lens 13 of the projector 100A. The image pickup unit 26 picks up an image of an area including a projected line image area, based on an instruction from the control unit 20, and outputs the picked-up image as picked-up image data to the picked-up image analyzing unit 25. Also, the image pickup unit 26 is not limited to a CCD camera and other image pickup devices may be used.

The line information storage unit 31 stores line information as information of a line image (that is, line image data). In the line information storage unit 31, plural line image data corresponding to various sporting events are stored. The line information storage unit 31 outputs line image data indicated by the line information selecting unit 32 to the line information selecting unit 32.

The line information selecting unit 32 elects one line image data based on an instruction from the control unit 20, from among the plural pieces of line information (line image data), input the line image data from the line information storage unit 31, and outputs this line image data to the image processing unit 35. As the user operates the line image switching key provided on the operation accepting unit 21 and thus designates a desired line image, the control unit 20 instructs the line information selecting unit 32 to output the designated line image data to the image processing unit 35.

The image processing unit 35 converts the line image data inputted from the line information selecting unit 32 to image data representing the gradation of each pixel of the liquid crystal light valve 12. Here, the converted image data includes plural pixel values corresponding to all the pixels of the liquid crystal light valve 12. A pixel value defines the light transmittance of the corresponding pixel. The intensity (gradation) of light transmitted through each pixel is prescribed by this pixel value. Also, the image processing unit 35 carries out image quality adjustment processing and the like to adjust brightness, contrast, sharpness, hue and the like of the converted image data, based on an instruction from the control unit 20. Moreover, image processing unit 35 carries out processing to superimpose an OSD (on-screen display) image on the image data, if necessary. The image processing unit 35 outputs the image data on which such adjustment and processing is done, to the keystone correction unit 36.

Moreover, the image processing unit 35 can carry out processing to set all the pixel values to a minimum value (0) so that the light transmittances of all the pixels become minimum, based on an instruction from the control unit 20. In this case, the image data with all the pixel values set to 0, that is, image data representing a black solid image (hereinafter also referred to as a "mute image") is outputted to the keystone correction unit 36. In this manner, the image processing unit 35 can switch between a state of outputting image data based on line information and a state of outputting image data representing a mute image, according to an instruction from the control unit 20.

The keystone correction unit 36 carries out correction of inputted image data (keystone correction) in order to restrain distortion (keystone distortion) which enlarges a projected image in the direction of inclination when the projector 100A projects a line image from an oblique direction in relation to the floor surface F. The control unit 20 instructs the keystone correction unit 36 to carryout keystone correction, using information that the cursor key provided on the operation accepting unit 21 is pressed as information of a keystone correction instruction. The keystone correction unit 36 carries out keystone correction.

Keystone correction is to thin out pixel values from image data and thus reduce a projected image as it goes into the direction of inclination. The keystone correction unit 36 outputs the corrected image data to the light valve driving unit 14. Meanwhile, when keystone correction is not carried out, the image data outputted from the image processing unit 35 is directly outputted to the light valve driving unit 14. As the light valve driving unit 14 drives the liquid crystal light valve 12 according to the pixel values of the inputted image data, an image corresponding to the image data is projected on the floor surface F.

Here, the keystone correction carried out by the keystone correction unit 36 will be described, using FIG. 6, FIG. 7 and FIG. 8.

Figure 6:
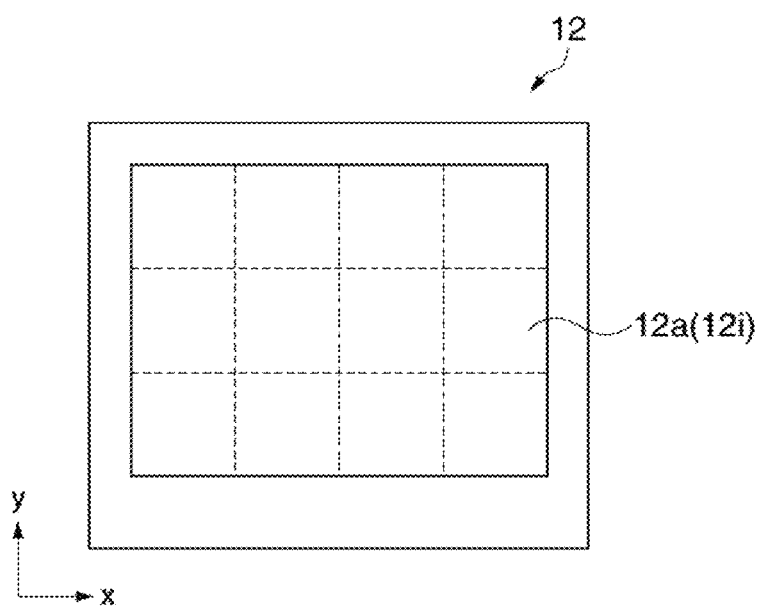
FIG. 6 It is a front view showing a liquid crystal light valve as viewed from a light incident side.
Figure 7A:
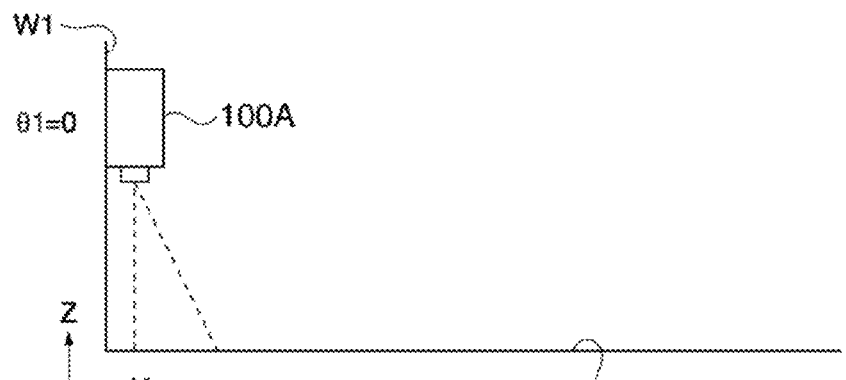
FIG. 7 It is an explanatory view of a projecting direction of a projector and a projected image, where (a) is a side view showing a state where the projector projects vertically below, (b) is a front view showing a projected image displayed on the floor surface at that time, (c) is a side view showing a state where the projector projects in an inclined state, and (d) is a front view showing a projected image displayed on the floor surface at that time.
Figure 7B:
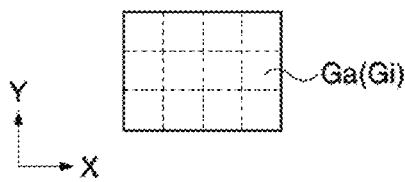
Figure 7C:
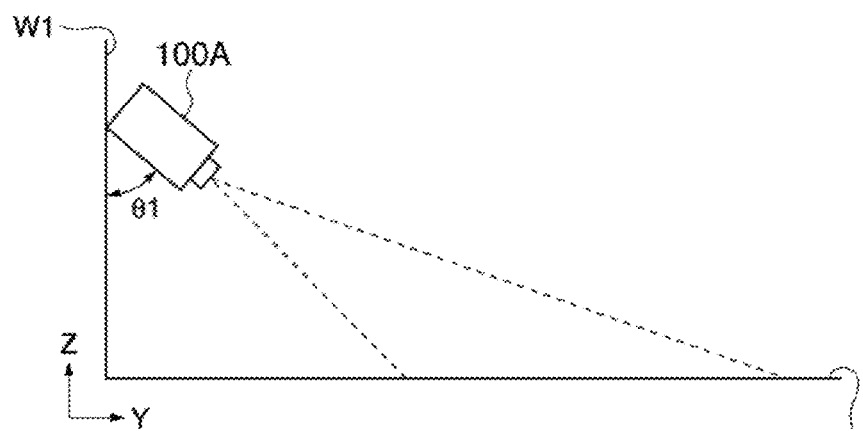
Figure 7D:
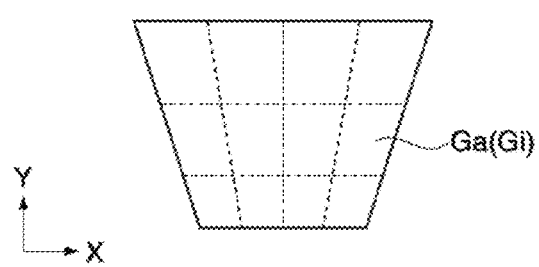

FIG. 6 is a front view showing the liquid crystal light valve 12 as viewed from a light incident side.

FIG. 7 is an explanatory view of a projecting direction of the projector 100A and a projected image. Here, FIG. 7(*a*) is a side view showing a state where the projector 100A projects vertically below, FIG. 7(*b*) is a front view showing a projected image displayed on the floor surface F at that time. Also, FIG. 7(*c*) is a side view showing a state where the projector 100A projects in an inclined state, and FIG. 7(*d*) is a front view showing a projected image displayed on the floor surface F at that time.

In addition, in FIG. 6 and FIG. 7, the left-right direction facing the liquid crystal light valve 12 is defined as ±x direction and the up-down direction is defined as ±y direction. The left-right direction facing the floor surface F is defined as ±X direction and the up-down direction is defined as ±Y direction. Here, X direction and Y direction on the floor surface F correspond to x direction and y direction on the liquid crystal light valve 12, respectively. For example, light transmitted through a top right (+x, +y side) pixel in the pixel area 12a is projected to the top right (+X, +Y side) on the floor surface F.

Also, in FIG. 6 and FIG. 7, a lattice-like pattern shown in the pixel area 12a and in a projected image Ga is lines that are supplementally added to show the correspondence between an image formed in the pixel area 12a and the projected image Ga projected on the floor surface F, and is not intended to actually display such a pattern.

As shown in FIG. 6, when keystone correction is not carried out, the liquid crystal light valve 12 forms an image (input image Gi) based on the image data inputted from the keystone correction unit 36, in the entire pixel area 12a. That is, in this case, the area for forming the input image Gi (image forming area 12i) is coincident with the pixel area 12a.

Here, in the case where the projector 100A is installed vertically and performs projection without any inclination in relation to the floor surface F, as shown in FIG. 7(*a*), (*b*), the projected image Ga (input image Gi) displayed on the floor surface F has the same rectangular shape as the pixel area 12a.

Meanwhile, in the case where the projector 100A is installed, inclined in relation to the floor surface F, and performs projection in an oblique direction (+Y direction), as shown in FIG. 7(*c*), (*d*), the projected image Ga displayed on the floor surface F is distorted in a trapezoidal shape enlarged in ±X direction and +Y direction as it goes into the direction of inclination (+Y direction). In this embodiment, keystone correction in the case where such inclined projection in +Y direction (vertical direction) is carried out will be described.

Figure 8A:
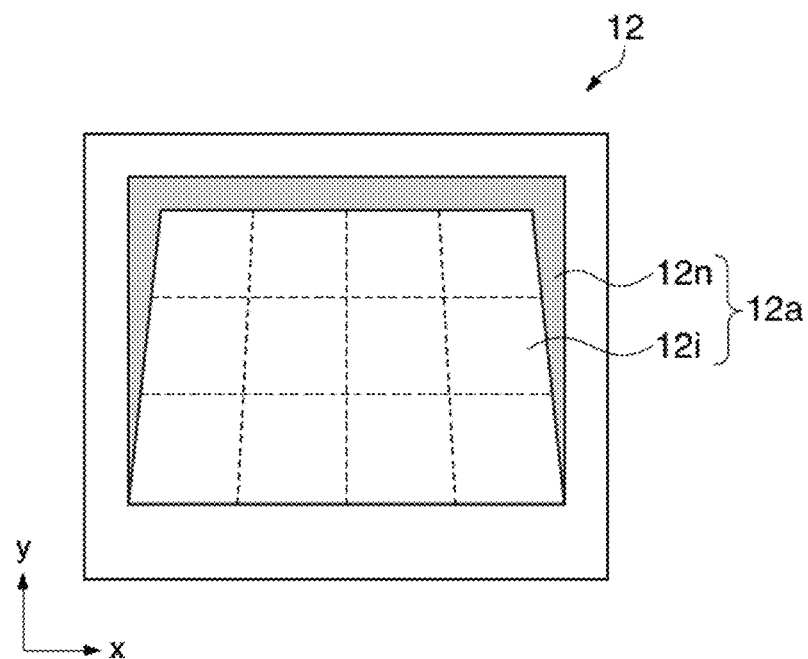
FIG. 8 It is an explanatory view for explaining keystone correction, where (a) is a front view showing a liquid crystal light valve as viewed from a light incident side, and (b) is front view showing a projected image displayed on the floor surface in the case of inclined projection.
Figure 8B:
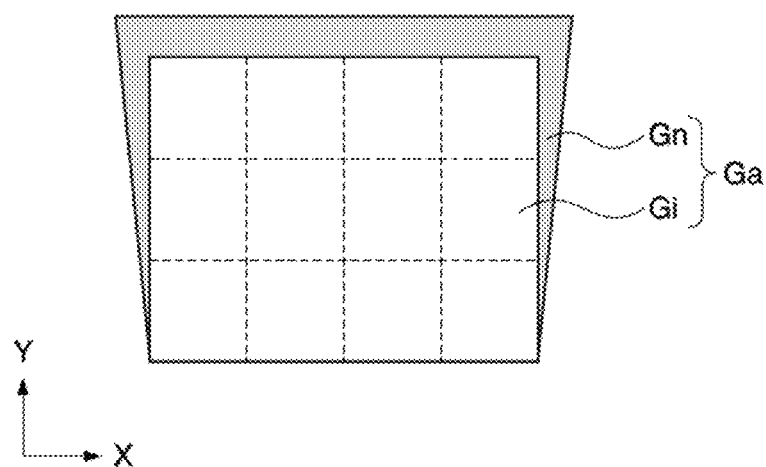

FIG. 8 is an explanatory view for explaining keystone correction. FIG. 8(*a*) is a front view showing the liquid crystal light valve 12 as viewed from a light incident side. FIG. 8(b) is a front view showing a projected image displayed on the floor surface F in the case where inclined projection is carried out.

The keystone correction unit 36 thins out pixel values from the image data inputted from the image processing unit 35 and carries out correction so that the projected image Ga is reduced as it goes into the direction of inclination (+Y direction), compared with the case where correction is not carried out. Specifically, as shown in FIG. 8(a), (b), the image forming area 12i having a reversed trapezoidal shape of the projected image Ga, that is, a shape with a lateral width reduced as it goes into the direction of inclination (+y direction), is set in the pixel area 12a of the liquid crystal light valve 12. Moreover, by thinning out more pixel values from the image data at positions with higher degrees of enlargement by inclined projection, the input image Gi is formed within this image forming area 12i.

Also, the keystone correction unit 36 corrects the image data so that the light transmittance of each pixel 12p included in an area 12n outside the image forming area 12i becomes minimum. Consequently, as shown in FIG. 8(b), since the distortion of the input image Gi due to inclined projection is corrected and little light is cast on an area Gn within the projected image Ga corresponding to the area 12n, the input image Gi is displayed in a regular shape (rectangular shape) on the floor surface F. In addition, to compensate for the lack of gradation information due to the thinning of pixel values, it is desirable to correct the pixel values of pixels near the thinning target pixels according to the thinned-out pixel values.

In this embodiment, the projector 100A performs keystone correction as described above and projects a lien image on the floor surface F.

Figure 9A:
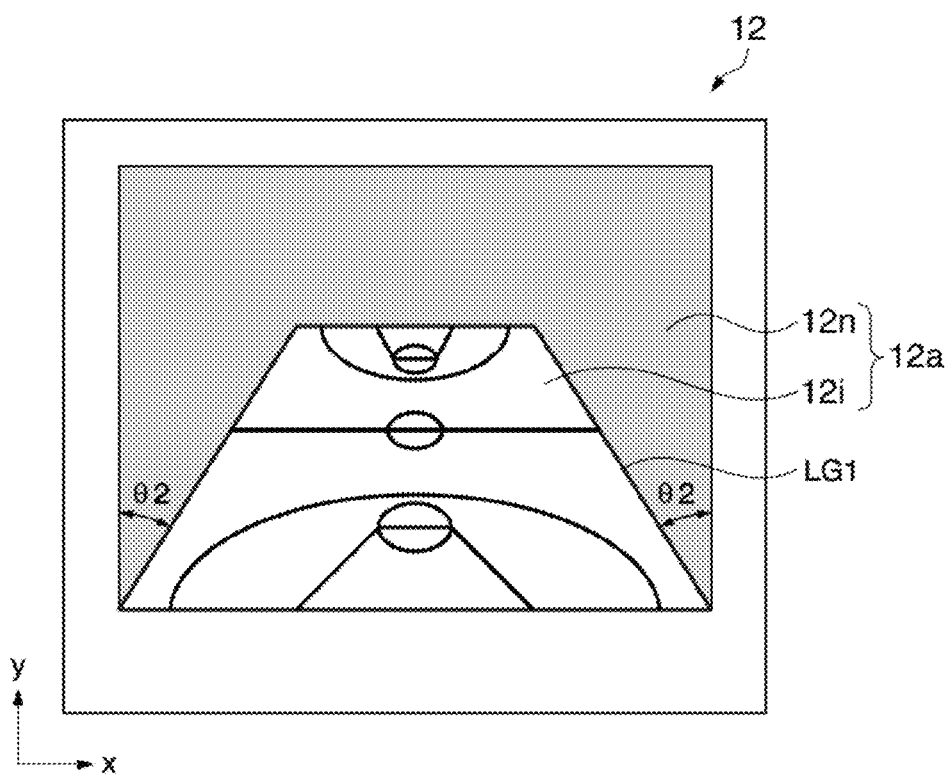
FIG. 9 It is an explanatory view of projection of a line image, where (a) is a front view showing a liquid crystal light valve as viewed from a light incident side, and (b) is a front view showing a projected image displayed on the floor surface in the case of inclined projection.
Figure 9B:
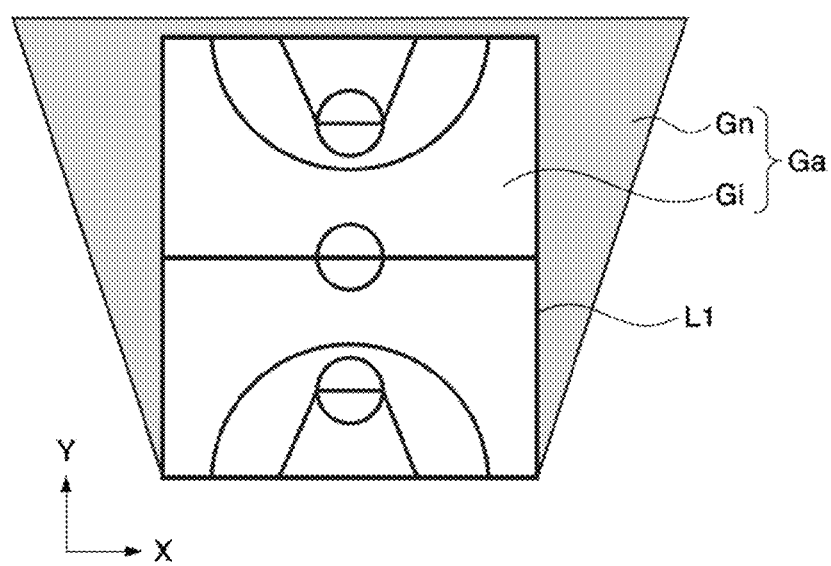

FIG. 9 is an explanatory view of projection of a line image. FIG. 9(a) is a front view showing the liquid crystal light valve 12 as viewed from a light incident side, and FIG. 9(b) is a front view showing a projected image displayed on the floor surface F in the case of inclined projection. FIG. 9(a) corresponds to FIG. 8(a). FIG. 9(b) corresponds to FIG. 8(b).

The keystone correction unit 36 corrects image data and forms line image data LG1 in the trapezoidal image forming area 12i as shown in FIG. 9(a). Here, line image data of a basketball court is shown. Also, the keystone correction unit 36 corrects image data so that the light transmittance of each pixel 12p included in the area 12n outside the image forming area 12i becomes minimum. Consequently, since distortion of the input image Gi due to inclined projection is corrected and little light is cast onto the area Gn within the projected image Ga corresponding to the area 12n, the input image Gi (line image data LG1) is displayed on the floor surface F as lines L1 in a regular shape (rectangle), as shown in FIG. 9(b).

Here, the relation between an angle θ2 of the trapezoid when the trapezoidal image forming area 12i is formed on the liquid crystal light valve 12 shown in FIG. 9(a) (hereinafter referred to as a "keystone correction angle θ2") and an angle θ1 between the wall W1 and the projector 100A (hereinafter referred to as an "installation angle θ1") will be described.

Figures 10A, 10B:
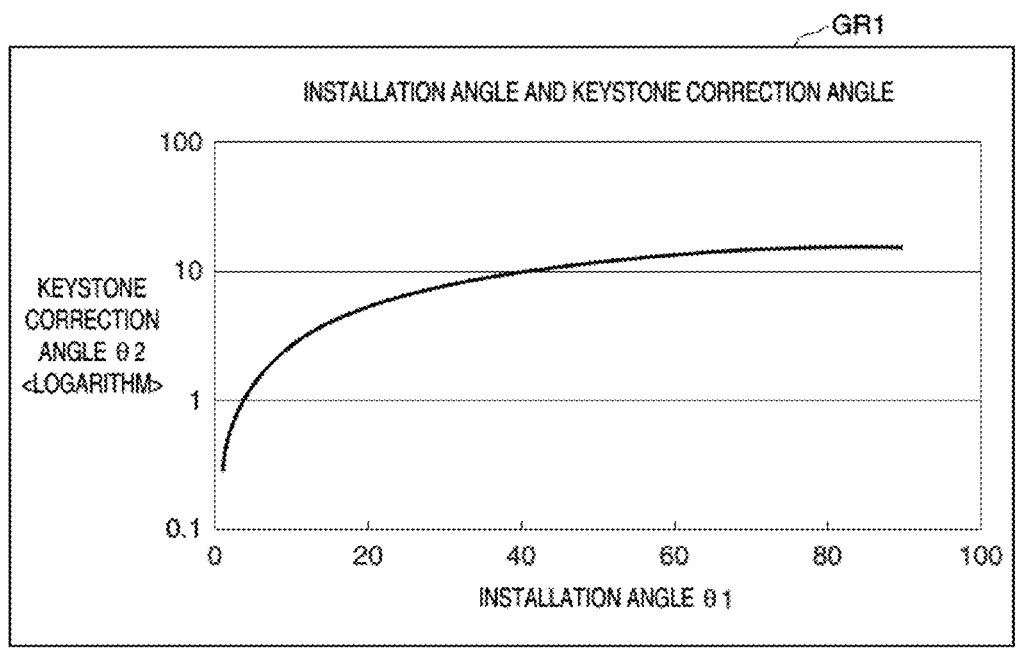
FIG. 10 It is an explanatory view of the relation between installation angle and keystone correction angle, where (a) is a correspondence table showing installation angle, keystone correction angle, and magnification in the direction of height of projected image, and (b) is a correspondence graph by installation angle and keystone correction angle.

FIG. 10 is an explanatory view of the relation between installation angle θ1 and keystone correction angle θ2. FIG. 10(a) is a correspondence table showing installation angle θ1, keystone correction angle θ2, and magnification k in the direction of height of the projected image. FIG. 10(b) is a correspondence graph by installation angle θ1 and keystone correction angle θ2. In addition, the values of such installation angle θ1, keystone correction angle θ2 and magnification k in the direction of height of the projected image are calculated in advance based on experiment or simulation.

In a correspondence table T1 of FIG. 10(a), installation angles θ1 of 0 to 70 degrees are shown and a keystone correction angle θ2 corresponding to each installation angle θ1 is shown. Also, in the correspondence table T1, a magnification k in the direction of height of the projected image corresponding to each installation angle θ1 is shown. The magnification k in the direction of height of the projected image represents the magnification of the length of the projected image Ga in +Y direction in the case where the installation angle θ1 is changed, assuming that the length of the projected image Ga in +Y direction is 1 when the installation angle θ1 is 0 degrees.

In FIG. 10(b), the relation between installation angle θ1 and keystone correction angle θ2 is shown as a graph GR1. The horizontal axis of the graph GR1 represents the installation angle θ1, and the vertical axis represents the keystone correction angle θ2 (logarithm). Next, using the information of the correspondence table T1 and the graph GR1, a method for deciding the trapezoidal image forming area 12i to be formed on liquid crystal light valve 12 will be described.

To form the trapezoidal image forming area 12i on the liquid crystal light valve 12, the keystone correction angle θ2 is found from the installation angle θ1, using the correspondence table T1 and the graph GR1. Moreover, a height a of the image in the trapezoidal image forming area 12i is found.

When the installation angle θ1 is 0 degrees, the magnification of the height of the projected image projected on the floor surface F in relation to the height a of the image in the image forming area 12i on the liquid crystal light valve 12 is j. Here, the value of j can be found by actual measuring or the like. Then, at the time of the installation angle θ1, a height d of the projected image projected on the ground surface is expressed by the following equation.

$$d = a \times j \times k \tag{1}$$

The height d of the projected image can be decided depending on how long in meters the line L1 is actually displayed. Thus, by the above equation (1), the height a of the image in the trapezoidal image forming area 12i formed on the liquid crystal light valve 12 can be calculated.

As described above, the height a of the image in the trapezoidal image forming area 12i formed on the liquid crystal light valve 12, and the keystone correction angle θ2 are calculated, and the trapezoidal image forming area 12i can be decided.

Figure 11:
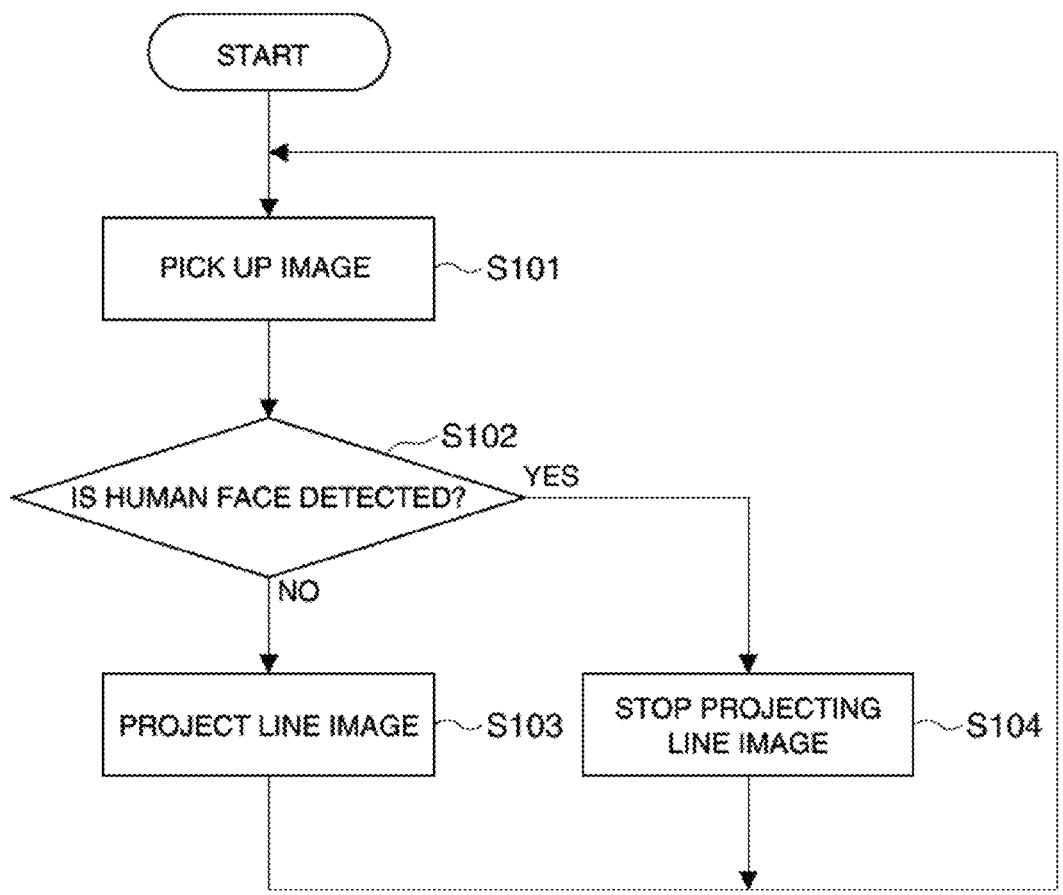
FIG. 11 It is a flowchart of processing in the projector when a face is detected.

Next, processing in the case where a human face is detected when the projector 100A projects a line image will be described. FIG. 11 is a flowchart of processing in the projector 100A when a face is detected.

The control unit 20 gives an instruction to the image pickup unit 26 to pick up an image of an area including the projected line image area and to output picked-up image data to the picked-up image analyzing unit 25 (step S101). The control unit 20 gives an instruction to the picked-up image analyzing unit 25 to analyze the picked-up image data and determines whether a human face is detected or not (step S102). If no human face is detected (step S102: NO), the line image is projected (step S103) and the processing goes back to step S101.

If a human face is detected (step S102: YES), the control unit 20 gives an instruction to the image processing unit 35 to output a mute image and to stop projection of the line image (step S104). The control unit 20 and the image processing unit 35 at this time are equivalent to the image mute unit. Then, the processing goes back to step S101.

In this manner, if a human face is detected in picked-up image data, the projector 100A stops projecting the line image. Then, when a human face is no longer detected, the projection of the line image can be resumed.

According to the above first embodiment, the following effects can be achieved.

(1) Each of the projector 100A and the projector 100B provided in the line display system 1 projects a line image from an oblique direction to the floor surface F so that the lines L1 are superimposed on each other. Thus, cases where the sporting event is changed can be coped with easily by changing the line image projected by the projectors 100A, 100B. Then, the lines L1 are superimposed and therefore displayed clearly. Also, even when the line image projected from one direction is interrupted by the athlete H, the lines are displayed by the line image projected from the other direction and therefore situations where the lines L1 are no longer displayed can be reduced. Moreover, since the projectors 100A, 100B project the line image obliquely to the floor surface F from a lower position than the height of the athlete H's eyes, dazzlement of the projected light can be reduced, compared with the case where the line image is projected from a perpendicular direction to the floor surface F. For example, it is advantageous in a sport using a ball where the athlete H often looks upward.

(2) The projector 100A and the projector 100B provided in the line display system 1 have the line information storage unit 31 which stores plural pieces of line information. The user can select one of the plural pieces of line information. Then, the projectors 100A, 100B project line image based on the selected line information. Thus, there is no need to connect a device for supplying line information to the projectors 100A, 100B, and the line display system 1 can be simplified. Also, since the user can select a desired line image by operating the operation accepting unit 21 on the projectors 100A, 100B, convenience is improved.

(3) The projector 100A and the projector 100B provided in the line display system 1 transmit and receive line information. The projectors 100A, 100B project line image of the same sporting event. Thus, if the user carries out a line image selection operation on one projector, line information is transmitted from the projector to the other projector. Therefore, there is no need to carry out a line image selection operation on the other projector and convenience is improved.

(4) The projector 100A and the projector 100B provided in the line display system 1 temporarily stop projecting the line image when a human face is detected in the image picked up by the image pickup unit 26. Thus, if a human face enters the optical path of projected light when the projectors 100A, 100B are projecting the line image, the projection of the line image is stopped. Therefore, it can be avoided that a person finds the light dazzling.

Second Embodiment

Hereinafter, a second embodiment will be described.

A line display system 2 according to the second embodiment has a personal computer (hereinafter referred to as a "PC") 300 as a line information supply device, in addition to plural projectors. Then, a line image is projected, based on the line information supplied from the PC 300.

Figure 12:
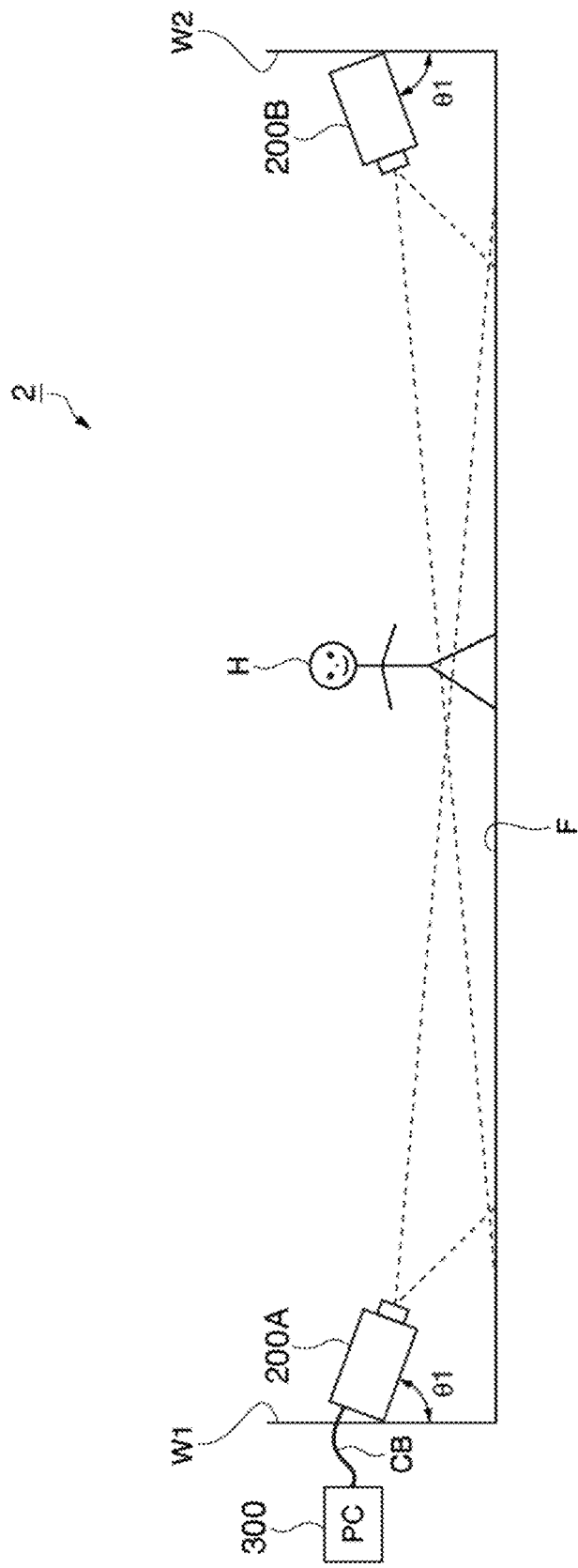
FIG. 12 It is an explanatory view showing a state of a stadium where a line image is projected by a line display system according to a second embodiment, as viewed from a lateral side.

FIG. 12 is an explanatory view showing a state of a stadium where a line image is projected by the line display system 2 according to a second embodiment, as viewed from a lateral side. As shown in FIG. 12, the line display system 2 of this embodiment is configured with two projectors 200A, 200B and the PC 300. Also, an athlete H is shown in FIG. 12.

The projector 200A and the projector 200B are installed on a wall W1 and a wall W2 and project a line image on a floor surface F from oblique directions, similarly to the line display system 1 according to the first embodiment. The PC 300 is connected to the projector 200A via a cable CB.

Figure 13:
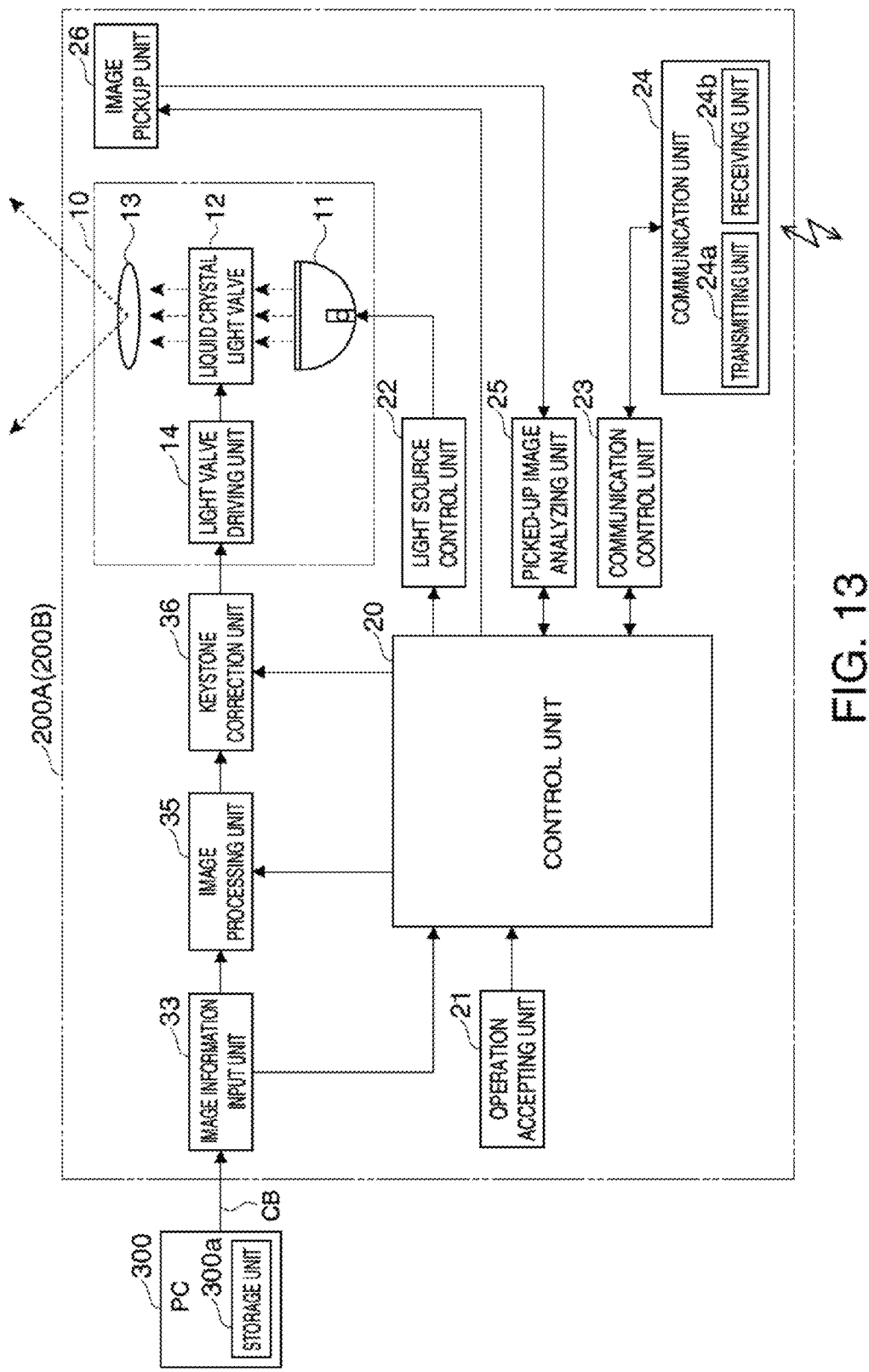
FIG. 13 It is a block diagram showing a schematic configuration of a projector.

FIG. 13 is a block diagram showing a schematic configuration of the projector 200A according to this embodiment. Using FIG. 13, the internal configuration of the projector 200A will be described. Also the internal configuration of the projector 200B is similar to the projector 200A.

The projector 200A does not include the line information storage unit 31 or the line information selecting unit 32 which are provided in the projector 100A according to the first embodiment shown in FIG. 4. Also, the projector 200A includes an image information input unit 33. Then, the image information input unit 33 inputs line information from the PC 300 via the cable CB. The other parts of the configuration are similar to the projector 100A according to the first embodiment shown in FIG. 4. Also, the reference numeral of each component is the same. Moreover, keystone correction carried out by the keystone correction unit 36 and processing when a face is detected are similar to the first embodiment and therefore will not be described.

Hereinafter, differences from the first embodiment will be described.

In the image information input unit 33, various image input terminals (not shown) for making connection via the cable with external image supply devices (not shown) such as a PC, video playback device, memory card, USB storage, and digital camera, are provided, and image information is inputted from the image supply devices. In this embodiment, the image supply device is the PC 300 and line information is inputted. The image information input unit 33 converts the inputted line information to line image data in a format that can be processed by the image processing unit 35, and outputs the line image data to the image processing unit 35. Also, the image information input unit 33 outputs the line information to the control unit 20. Then, the control unit 20 transmits the line information to the other projector 200B via the communication control unit 23 and the communication unit 24. Thus, the other projector 200B receives the line information and can project the line image.

The operation accepting unit 21 does not have the "line image switching key" and has an "input switching key" for switching input sources.

The PC 300 is provided with a storage unit 300a, which stores line information as information of a line image. The storage unit 300a stores plural pieces of line information corresponding to various sporting events. The PC 300 outputs, to the projector 200A, line information selected by the user from among the line information stored in the storage unit 300a.

In the above line display system 2, based on line information inputted to the projector 200A from the PC 300, a line image is projected and thus the lines L1 can be displayed on the floor surface F.

According to the above second embodiment, similar effects to the effects (1), (3) and (4) of the first embodiment can be achieved. Additionally, the following effects can be achieved.

(1) The line display system 2 has the PC 300 in which plural pieces of line information are stored. Then, the PC 300 supplies the line information to the projector 200A. The projector 200A and the projector 200B project the line image based on the supplied line information. Thus, by storing various kinds of line information in the PC 300, line information can be added easily. Moreover, since the projector 200A and the projector 200B can project the line image based on the line information supplied from the PC 300, the internal configuration of the projectors 200A, 200B can be simplified.

Meanwhile, various changes, improvements and the like can be added to carry out the technique, without being limited to the above embodiments. Modification will be described hereinafter.

(Modification 1) In the above embodiments, the line image is projected by the two projectors. However, without being limited to this, two or more may be used. As the number of projectors becomes greater, the projected lines L1 are superimposed multiply and become clear. Also, even when the line image is interrupted by the athlete H, the line image is projected by the other plural projectors and therefore it is advantageous.

(Modification 2) In the above embodiments, keystone correction is carried out by the keystone correction units 36 of the projectors 100A and the projector 100B (or the projector 200A and the projector 200B). However, the line information stored in the line information storage unit 31 or the PC 300 may be stored as line information of the line image on which keystone correction is done in advance. Thus, since there is no need to carry out keystone correction by the keystone correction unit 36, processing carried out in the projector is simplified, which is advantageous. Also, in the second embodiment, the PC 300 may carry out keystone correction of line information and supply the line information after keystone correction to the projector 200A.

(Modification 3) In the above embodiments, the communication units 24 of the projector 100A and the projector 100B (or the projector 200A and the projector 200B) carry out communication via wireless communication waves. However, wired communication may be carried out. For example, IP network communication may be carried out via a network cable.

(Modification 4) In the above embodiments, the line image is projected on the floor surface F of a gymnasium. However, the line display system 1 or 2 may be installed in an outdoor stadium and a line image may be projected on the ground surface.

(Modification 5) In the above embodiments, the line display systems 1, 2 project the line image. However, an advertisement image or the like may be projected in addition to the line image. For example, by projecting and displaying an advertisement of a sponsor company on the floor surface F, advertising effects on the spectators of the sport can be achieved.

(Modification 6) In the above embodiments, as the lower position than the height of the athlete H's eyes, that is, a predetermined height, approximately 1 m from the floor surface or the ground surface is given as an example. However, the invention is not limited to this. The height at which the projectors 100A, 100B (200A, 200B) are installed may be decided, based on the height of the athlete H's eyes in a crouching position. Also, the height at which the projectors are installed may be decided, based on optical characteristic and keystone correction capability of the projectors.

(Modification 7) In the above embodiments, projection of the line image is stopped when a human face is detected in an image picked up by the image pickup unit 26. However, the invention is not limited to this. For example, light of the line image projected by the projectors 100A, 100B (200A, 200B) may be prevented from becoming incident directly on the eyes of the athlete H by drawing a mask image in the image forming area 12i on the liquid crystal light valve 12 corresponding to the place where the human face is detected. Thus, the possibility of completely stopping the projection of the line image during the sport is reduced, and a line display system with secured safety which does not hinder the proceeding of the sport can be provided.

(Modification 8) The projectors 100A and the projector 100B (or the projector 200A and the projector 200B) in the above embodiments use the transmission-type liquid crystal light valve 12 as a light modulator. However, a reflection-type light modulator such as a refection-type liquid crystal light valve can also be used. Moreover, a micromirror array device or the like which modulates light exiting a light source by controlling the exiting direction of the incident light for each micromirror as a pixel, may be used.

DESCRIPTION OF REFERENCE NUMERALS AND SIGNS 1, 2 . . . line display system, 10 . . . image projecting unit, 11 . . . light source, 12 . . . liquid crystal light valve, 12a . . . pixel area, 12i . . . image forming area, 12n . . . area, 12p . . . pixel, 13 . . . projection lens, 14 . . . light valve driving unit, 20 . . . control unit, 21 . . . operation accepting unit, 22 . . . light source control unit, 23 . . . communication control unit, 24 . . . communication unit, 24a . . . transmitting unit, 24b . . . receiving unit, 25 . . . picked-up image analyzing unit, 26 . . . image pickup unit, 31 . . . line information storage unit, 32 . . . line information selecting unit, 33 . . . image information input unit, 35 . . . image processing unit, 36 . . . keystone correction unit, 100A, 100B, 200A, 200B . . . projector, 300 . . . PC, 300a . . . storage unit, F . . . floor surface, GR1 . . . graph, L1, L2 . . . line, LG1 . . . image data of line, T1 . . . correspondence table, W1, W2 . . . wall

The invention claimed is:

1. A line display system which displays a line image representing a court or field corresponding to a sporting event, on a floor surface or a ground surface,
    the system comprising plural projectors, each of which is installed to project the entire line image respectively on the floor surface or the ground surface from plural different directions with respect to the floor surface or the ground surface,
    wherein the plural projectors are angled with respect to each other such that the projection of the line image from each projector is overlapped by at least one other projection of the line image projected from at least one other projector so that the line images are superimposed on each other on the floor surface or the ground surface,
    wherein each of the plural projectors includes
        a line information storage unit which stores plural pieces of line information as information of the line image, and
        a selection operation accepting unit which accepts a selection operation to select one of the plural pieces of line information stored in the line information storage unit,
    wherein the plural projectors project the line image based on the line information selected by the selection operation accepting unit.

2. The line display system according to claim 1,
    wherein the plural projectors are installed at different positions from each other.

3. The line display system according to claim 1,
    wherein each of the plural projectors is installed at a lower position than a predetermined height in relation to the floor surface or ground surface and projects the line image from obliquely above.

4. The line display system according to claim 1,
further comprising a line information supply device which stores plural pieces of line information as information of the line image and supplies the line information to the projectors,
wherein the plural projectors project the line image based on the line information supplied from the line information supply device.

5. The line display system according to claim 1,
wherein each of the projectors has a communication unit for communicating with the other projector(s), and
the projector transmits and receives the line information to and from the other projector(s) via the communication unit, and the plural projectors project the line image of the same sporting event.

6. The line display system according to claim 1,
wherein each of the plural projectors includes
an image pickup unit which picks up an image of an area including a projected line image area,
a picked-up image analyzing unit which analyzes the image picked up by the image pickup unit, and
an image mute unit which stops projection of the line image by the projector when a human face is detected by the picked-up image analyzing unit.

7. The line display system according to claim 1, wherein each of the projectors is placed to project the line image from a position that is not directly over the floor surface or the ground surface where the line image is projected.

8. The line display system according to claim 1, wherein the projectors are positioned at opposite ends of the floor surface or the ground surface.

9. The line display system according to claim 1, wherein the projectors are positioned at a height of approximately 1 meter or less from the floor surface or the ground surface.

10. A line display system which displays a line image representing a court or field corresponding to a sporting event, on a floor surface or a ground surface,
the system comprising plural projectors, each of which is installed to project the entire line image respectively on the floor surface or the ground surface from plural different directions with respect to the floor surface or the ground surface,
wherein the plural projectors are angled with respect to each other such that the projection of the line image from each projector is overlapped by at least one other projection of the line image projected from at least one other projector so that the line images are superimposed on each other on the floor surface or the ground surface
wherein each of the plural projectors includes
an image pickup unit which picks up an image of an area including a projected line image area,
a picked-up image analyzing unit which analyzes the image picked up by the image pickup unit, and
an image mute unit which stops projection of the line image by the projector when a human face is detected by the picked-up image analyzing unit.

11. The line display system according to claim 10,
wherein the plural projectors are installed at different positions from each other.

12. The line display system according to claim 10,
wherein each of the plural projectors is installed at a lower position than a predetermined height in relation to the floor surface or ground surface and projects the line image from obliquely above.

13. The line display system according to claim 10,
further comprising a line information supply device which stores plural pieces of line information as information of the line image and supplies the line information to the projectors,
wherein the plural projectors project the line image based on the line information supplied from the line information supply device.

14. The line display system according to claim 10,
wherein each of the projectors has a communication unit for communicating with the other projector(s), and
the projector transmits and receives the line information to and from the other projector(s) via the communication unit, and the plural projectors project the line image of the same sporting event.

15. The line display system according to claim 10, wherein each of the projectors is placed to project the line image from a position that is not directly over the floor surface or the ground surface where the line image is projected.

16. The line display system according to claim 10, wherein the projectors are positioned at opposite ends of the floor surface or the ground surface.

17. The line display system according to claim 10, wherein the projectors are positioned at a height of approximately 1 meter or less from the floor surface or the ground surface.

\* \* \* \* \*